United States Patent [19]
Gregory et al.

[11] Patent Number: 5,141,330
[45] Date of Patent: Aug. 25, 1992

[54] THIN-FILM QUADRANT TEMPERATURE SENSOR FOR USE IN A SYSTEM TO CONTROL THE ALIGNMENT OF A $CO_2$ LASER BEAM

[75] Inventors: Otto J. Gregory, Wakefield; Kenneth A. Burbank, Coventry, both of R.I.

[73] Assignee: The Board of Governors for Higher Education, State of Rhode Island and Providence Plantations, Providence, R.I.

[21] Appl. No.: 650,689

[22] Filed: Feb. 5, 1991

[51] Int. Cl.⁵ ............................................. G01J 5/12
[52] U.S. Cl. ........................................ 374/32; 374/6; 250/491.1
[58] Field of Search ................... 374/6, 32; 250/491.1

[56] References Cited

U.S. PATENT DOCUMENTS

| | | | |
|---|---|---|---|
| 3,596,514 | 8/1971 | Mefferd et al. | 374/32 |
| 3,738,168 | 6/1973 | Mansell | 374/32 |
| 4,035,654 | 7/1977 | Elmer | 250/491.1 |
| 4,059,359 | 11/1977 | Foster et al. | 374/32 |
| 4,243,888 | 1/1981 | Gruhn et al. | 374/6 |
| 4,321,824 | 3/1982 | Martin | 374/32 |
| 4,626,649 | 12/1986 | Dupeyrat et al. | 250/491.1 |
| 4,692,623 | 9/1987 | Roberts et al. | 374/32 |
| 4,793,715 | 12/1988 | Kasner et al. | 374/6 |
| 4,865,446 | 9/1989 | Inoue et al. | 374/32 |
| 4,964,735 | 10/1990 | Sasnett et al. | 374/32 |

FOREIGN PATENT DOCUMENTS

| | | | |
|---|---|---|---|
| 0088103 | 4/1989 | Japan | 250/491.1 |
| 0437927 | 7/1974 | U.S.S.R. | 374/32 |

OTHER PUBLICATIONS

Foster, T. F. et al., "A New Approach to Laser Beam Heat Flux and Power Profiling," ISA Transactions, vol. 18, No. 4 (1979).

Primary Examiner—William A. Cuchlinski, Jr.
Assistant Examiner—Diego F. F. Gutierrez
Attorney, Agent, or Firm—Samuels, Gauthier & Stevens

[57] ABSTRACT

A thermoconductive sensor for aligning a laser beam which includes a substrate, a dielectric layer disposed on the substrate to provide electrical insulation, an insulating layer interposed between the dielectric layer and the substrate and a reflective/refractive material embedded in the layer to reflect heat from the layer and to conduct heat through a plurality of fingers. A plurality of serially connected thermocouples communicate with the fingers to provide an output of the changes and the thermoconductivity to then realign the laser beam.

9 Claims, 1 Drawing Sheet

THIN-FILM QUADRANT TEMPERATURE SENSOR FOR USE IN A SYSTEM TO CONTROL THE ALIGNMENT OF A CO₂ LASER BEAM

FIELD OF THE INVENTION

A thin-film quadrant temperature sensor for use in a system to control the alignment of a $CO_2$ laser beam.

BACKGROUND AND BRIEF SUMMARY OF THE INVENTION

An important factor in the use of lasers is the precision with which the beam is controlled. Various sensors are used to measure the beam location, usually by measuring variations in beam intensity from a null state to provide outputs to a control system to adjust the beam alignment.

The prior art includes a variety of different laser control methods radiometers (Clifford U.S. Pat. No. 3,348,047), optics (Kunitsugo U.S. Pat. No. 4,867,560), radar (Lloyd U.S. Pat. No. 4,738,531), florescence (McClung, Jr. U.S. Pat. No. 4,700,068), and mirrors (Anderson U.S. Pat. No. 3,579,140). The sensor of choice is usually some type of photoconductive device. U.S. Pat. No. 3,723,013 discloses four quadrant silicon photodetectors used to control the positioning of a laser beam. U.S. Pat. No. 4,243,888 teaches the use of a silicon disk having thermoelectric properties.

Any material which permits optical radiation to pass through it absorbs a certain percentage of the incident power and dissipates it in the form of heat. This raises the temperature of the illuminated region and causes a temperature rise in the material which can be detected and measured by appropriately placed thermal sensors. In any sensor system, based on thermoconductive sensors, it is desirable to be able to accurately sense changes in thermoconductivity while minimizing the heat absorbed by the sensor.

The present invention embodies a sensor which has superior heat dissipation and enhanced detection characteristics when compared to prior art sensors.

Broadly the invention comprises a thermoconductive sensor, a dielectric layer to provide electrical insulation between the sensor and a supporting substrate, a heat sensitive material, and a layer to reflect heat embedded within the material including a plurality of extending fingers to conduct heat absorbed by the material. The dielectric material may include such materials as $SiO_2$, $Si_3N_4$, $Si_2ON_2$, $Al_2O_3$. The layer embedded within the material may include platinum or platinum rhodium. Preferably, the tips of the fingers extend through the material and into heat exchange relationship with the substrate which also functions as a heat sink. A plurality of serially connected thermocouples embedded within the material and spaced apart from the fingers provide an output corresponding to changes in thermoconductivity of the material. In the preferred embodiment, the reflective material is refractive. This feature, in combination with the heat sinking, aids in minimizing the impact on the sensor if the main beam strikes the sensor. Further, the sensor surface exposed to the beam is orthogonal with reference to the longitudinal axis of the beam. This also minimizes the incident power on the sensor surface and thus lessens the likelihood of damage.

DESCRIPTION OF THE PREFERRED EMBODIMENT(S)

Figure 1:
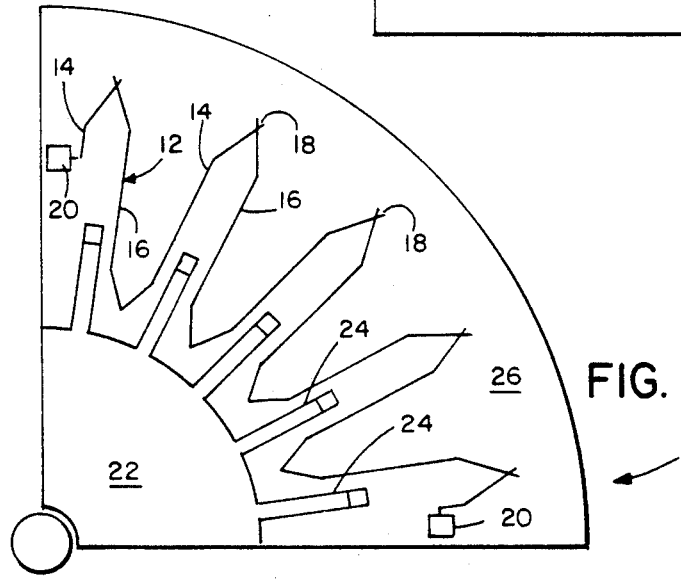
FIG. 1 is a top view of the platinum based thermocouple sensor.

Referring to FIG. 1, one quadrant 10 of a four quadrant silicon dioxide sensor 26 has embedded therein thermocouples 12 which include metal wires, such as platinum 14 and platinum/rhodium 16, connected in series to measure the heat conduction. The ends of the outermost thermocouples are bonded to pads 20. Also embedded within the silicon dioxide 26 is a layer of platinum 22 having extending fingers 24.

The outer thermocouples are reference junctions while the inner thermocouples sense the heat being conducted out by platinum fingers 24.

The sensitivity of the signal depends upon the number of junctions. The embodiment of the preferred invention maximizes the number of junctions. Further, the heat is collected over a large area causing the thermocouples to be particularly sensitive to changes anywhere in the quadrant.

Figure 2:
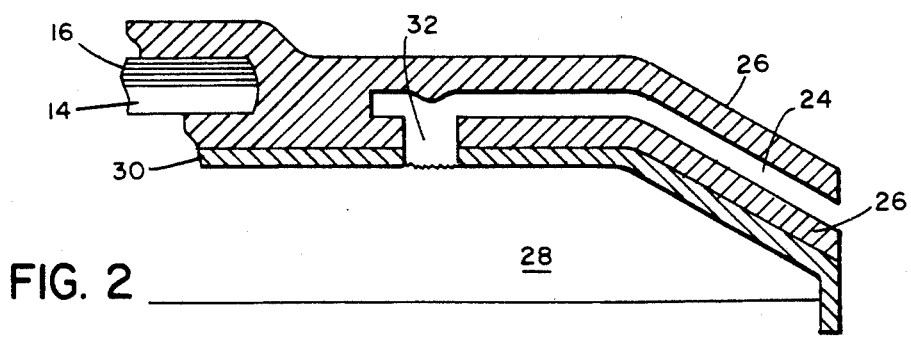
FIG. 2 is a side view of one thermocouple and its surrounding layers.

FIG. 2 is a side view of the sensor. The silicon dioxide 26 is supported on an aluminum substrate 28 which also acts as a heat sink for the silicon dioxide. An insulating layer 30 of $Al_2O_3$ is interposed between the silicon dioxide 26 and the substrate 28.

The platinum fingers 24 include depending fingertips 32 which pass through the silicon dioxide 26 and into contact with the aluminum substrate 28.

The platinum 24 is highly reflective and will (off axis) reflect most of the incident power. Some of the heat will be absorbed and conducted out along the platinum fingers 24 to the fingertips 32. The silicon dioxide will also absorb heat which heat will be conducted along the platinum fingers. The heat is sensed by the thermocouples.

The number of thermocouple elements can be large and will be determined by the photoresist definition limits. Preferred dimensions are 10 micrometer lines and spaces. The number of elements will determine the output voltage per quadrant.

It is also possible to put in a second series of thermocouples outside the first row. This set of thermocouples would be in parallel with the first set and could be a redundant set if desired.

Figure 3:
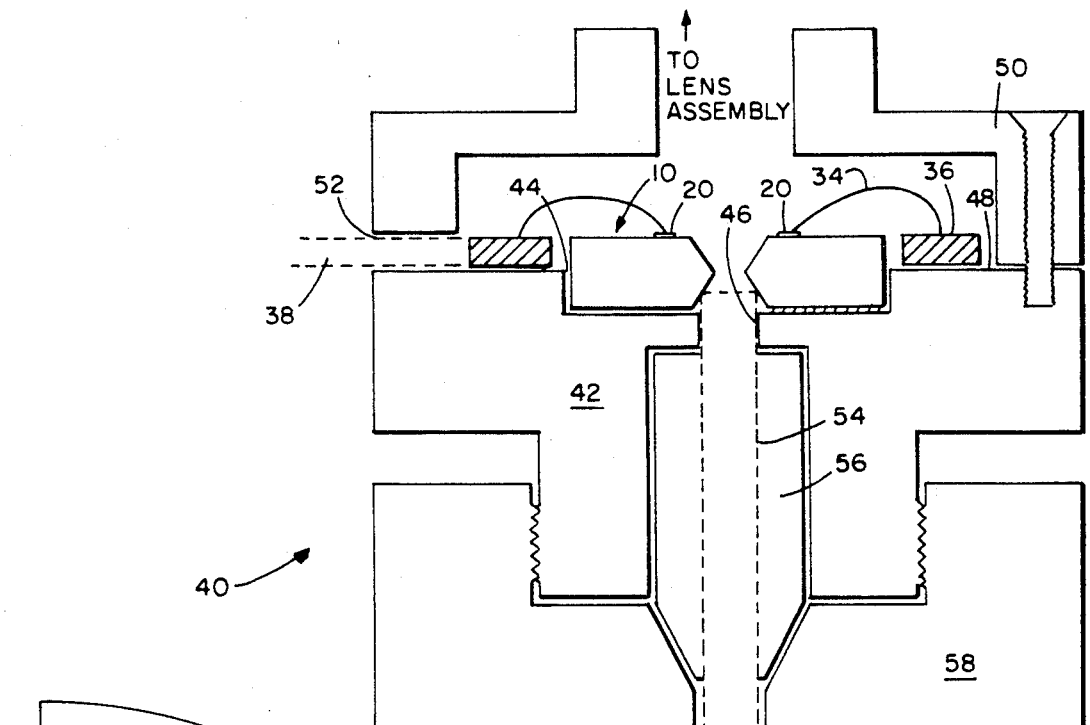
FIG. 3 is a sectional view of a packaging scheme.

Referring to FIG. 3, the pads 20 of the sensor 10 are connected in order to output the thermocouple signals, according to prior art methods, i.e. hybrid techniques, by gold wires 34 to a circuit board 36 which surrounds the sensor 10. The circuit board 36 includes an edge connector 38 and controls servo motors and mirrors (not shown) which position the beam. The control system monitors the photoconductive response in each quadrant. When there are unequal responses from the quadrants (the laser beam has moved out of alignment) the laser will be moved in the opposite direction of where the strongest response is located.

A waveguide assembly is shown generally at 40 and comprise a sensor block 42 having a circular recess 44 which is centrally apertured at 46. The sensor is secured within the recess 44. The sensor block 42 includes an upper surface 48. The circuit board 36 is secured to the surface 48. An annular sleeve 50 is joined to the sensor block and includes a recess at 52 through which the edge connector 38 passes. The dimensioning of the edge connector and the recess is such that light does not pass through the recess. A waveguide 54 is secured by a chamfered collet 56. The waveguide is centered by the chamfered surfaces of a silicon dioxide surface 26. The sensor substrate is epoxied in place using a thermally conductive epoxy which further aids in heat sinking the device. A locking nut 58 secures the sensor block 42 and collet 56 in place.

The purpose of the sensor is to keep the beam centered in the aperture. Approximately 5-10% of the laser beam's power is in the edge or "skirts" or "tails" of the beam. This reduced power is able to produce a useful signal. This keeps most of the laser's power away from the crystal. When the beam is centered, the power in the beam skirt will be equal on the four quadrants. If the beam move towards any quadrant, more power will be incident on that quadrant providing a larger temperature change, in turn providing a feedback signal to reposition the beam. Thus, the detector will notice temperature changes corresponding to the $CO_2$ laser beam position.

We claim:

1. A thin film sensor having an opening in the center thereof which comprises:
   a dielectric layer disposed on a substrate which substrate functions in part as a heat sink;
   an insulating layer interposed between the dielectric layer and the substrate;
   a reflective/refractive material embedded in the dielectric layer, the reflective/refractive material comprising a plurality of fingers extending radially outward from the center of the sensor;
   a plurality of thermocouples formed by thermocouple wires in communication with the fingers of the reflective/refractive material; and
   means to output signals from the thermocouples.

2. The sensor of claim 1 wherein the dielectric layer is selected from the group consisting of $SiO_2$, $Si_3N_4$, $Si_2ON_2$, $Al_2O_3$.

3. The sensor of claim 1 wherein the reflective/refractive material is selected from the group consisting of platinum, platinum rhodium.

4. The sensor of claim 1 wherein the thermocouple wires are selected from the group consisting of Pt/Rh and platinum.

5. The sensor of claim 1 wherein the fingers include tips which extend through the dielectric layer and are placed in communication with the substrate.

6. The sensor of claim 1 wherein the thermocouples are serially connected.

7. The sensor of claim 6 wherein the thermocouples trace a pattern offset from outer edges of the fingers.

8. The sensor of claim 7 wherein the thermocouples comprise inner and outer thermocouples and the outer thermocouples are reference junctions.

9. The sensor of claims 1 or 7 wherein the sensor comprises quadrants, the vertices of the quadrants defining the opening through which a beam of energy may pass to be sensed.

* * * * *